US012786603B2

(12) United States Patent
Feng et al.

(10) Patent No.: US 12,786,603 B2
(45) Date of Patent: Nov. 3, 2026

(54) OPTICAL-LINE TERMINATING DEVICE AND OPTICAL COMMUNICATIONS SYSTEM

(71) Applicant: Mitsubishi Electric Corporation, Tokyo (JP)

(72) Inventors: Chengguang Feng, Tokyo (JP); Satoshi Yoshima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 240 days.

(21) Appl. No.: 18/727,202

(22) PCT Filed: Jan. 28, 2022

(86) PCT No.: PCT/JP2022/003349
§ 371 (c)(1),
(2) Date: Jul. 8, 2024

(87) PCT Pub. No.: WO2023/145007
PCT Pub. Date: Aug. 3, 2023

(65) Prior Publication Data
US 2025/0080885 A1 Mar. 6, 2025

(51) Int. Cl.
*H04Q 11/00* (2006.01)
*H04B 10/564* (2013.01)

(52) U.S. Cl.
CPC ....... *H04Q 11/0067* (2013.01); *H04B 10/564* (2013.01)

(58) Field of Classification Search
None
See application file for complete search history.

(56) References Cited

U.S. PATENT DOCUMENTS

2009/0245790 A1* 10/2009 Mizutani ............... H04J 3/0682 398/43
2011/0142444 A1* 6/2011 Borges .................. H04L 12/413 398/25

(Continued)

FOREIGN PATENT DOCUMENTS

JP 2010-226693 A 10/2010
JP 2013-090025 A 5/2013

(Continued)

OTHER PUBLICATIONS

Adaptive Power Saving Mechanism for 10 Gigabit Class PON Systems, Ryogo Kubo et al., IEICE Trans. Commun., vol. E93-B, No. 2, Feb. 28, 2010.

(Continued)

*Primary Examiner* — Darren E Wolf
(74) *Attorney, Agent, or Firm* — PROCOPIO, CORY, HARGREAVES & SAVITCH LLP

(57) ABSTRACT

An OLT (110) includes: a first transceiver (122, 123) that performs optical communication with at least one first ONU; a second transceiver (124, 126) that performs optical communication with at least one second ONU; an power supply (142); a first transceiver control unit (127, 128) that controls the first transceiver (122, 123); a second transceiver control unit (129, 130) that controls the second transceiver (124, 126); and an OLT processing unit (141) that causes the first transceiver control unit (127, 128) to turn off power to the first transceiver (122, 123) during a first period when the number of the at least one first ONU falls below a predetermined number, and causes the second transceiver control unit (129, 130) to turn off power to the second transceiver (124, 126) during a second period when the number of the at least one second ONU falls below a predetermined number.

19 Claims, 5 Drawing Sheets

(56) References Cited

U.S. PATENT DOCUMENTS

| | | | | | |
|---|---|---|---|---|---|
| 2011/0211837 | A1 | 9/2011 | Sugawa et al. | | |
| 2012/0087662 | A1* | 4/2012 | Suzuki | H04J 14/0282 | 398/66 |
| 2013/0148972 | A1* | 6/2013 | Kazawa | H04Q 11/0067 | 398/100 |
| 2015/0215035 | A1* | 7/2015 | Idemaru | H04B 10/0731 | 398/38 |
| 2019/0170951 | A1* | 6/2019 | Funada | H04J 14/02 | |
| 2019/0181954 | A1 | 6/2019 | Kawase et al. | | |

FOREIGN PATENT DOCUMENTS

| | | | |
|---|---|---|---|
| JP | 2017-228965 | A | 12/2017 |
| WO | 2014/076778 | A1 | 5/2014 |

OTHER PUBLICATIONS

Office Action issued on Feb. 20, 2026 in connection with counterpart Republic of Korean Patent Application No. 10-2024-7023780, in 9 pages.

Japanese Patent Office, Office Action, Application No. 2023-576524, dated Oct. 1, 2024, in 6 pages.

* cited by examiner

OPTICAL-LINE TERMINATING DEVICE AND OPTICAL COMMUNICATIONS SYSTEM

CROSS-REFERENCE TO RELATED APPLICATIONS

This application is a US National Stage of International Patent Application PCT/JP2022/003349, filed on Jan. 28, 2022, the contents of which are incorporated herein by reference.

TECHNICAL FIELD

The disclosure relates to an optical-line terminating device and an optical communications system.

BACKGROUND ART

A passive optical network (PON) system, which is an optical communications system, includes an optical communication device (also referred to as "master station device") installed in a telecommunications carrier station building and multiple optical communication devices (also referred to as "sub-station devices") on the subscriber side (also called sub-station side). The station-side optical-line terminating device, which is a master station device, is also referred to as an optical line terminal (OLT), and the subscriber-side optical-line terminating devices, which are the sub-station devices, are also referred to as optical network units (ONUs). In a PON system, control is performed on the basis of time division multiplexing of uplink signals. An ONU transmits an uplink signal at a timing instructed to the ONU by the OLT. An uplink signal is an optical signal transmitted by an ONU to the OLT.

In PON systems, one giga (1G) class systems, such as the G-PON systems specified in the ITU-T G. 984 series, are widely used, so systems that achieve higher transmission speeds are required to coexist with such 1G class systems on the same optical fiber network. As a result, there is a need for OLTs that can simultaneously accommodate ONUs of multiple rates (e.g., three or more types) including 1G class systems.

To accommodate ONUs of different rates, optical transceivers implemented in an OLT must simultaneously support multiple rates. This is referred to as a multi-PON module (MPM). However, in a PON system in which an MPM is introduced, not all supported multiple transmission rates are in operation during all periods of commercial use. Typically, immediately after the introduction of an MPM, only low transmission rates (e.g., 1G) are in operation, and over the service period, the number of ONUs transmitting and receiving at low transmission rates gradually decreases, while the number of ONUs transmitting and receiving at high transmission rates increases. Eventually only ONUs transmitting and receiving at high transmission rates remain.

PTL 1 discloses a method of reducing MPM power consumption by shutting down the transmitting and receiving functions that support lower transmission rates in the MPM of a PON system in which only ONUs transmitting and receiving at high transmission rates remain at last.

PRIOR ART REFERENCE

Patent Reference

Patent Literature 1: Japanese Patent Application No. 2010-226693

SUMMARY OF THE INVENTION

Problem to be Solved by the Invention

In conventional PON systems, when even one ONU having a specific rate is connected to the MPM, it impossible to achieve low power consumption because, even if that rate is used infrequently, the transmitting and receiving functions of that rate continues to operate in the MPM as they normally do.

Accordingly, it is an object of one or more aspects of the disclosure to save power by turning off the power to a section that performs a transmitting and receiving function at a specific rate when the transmitting and receiving function is not used.

Means of Solving the Problem

An optical-line terminating device according to an aspect of the disclosure includes: a first transceiver configured to perform optical communication with at least one first ONU corresponding to a first transmission rate, the first transceiver being connected to the at least one first ONU via an optical fiber; a second transceiver configured to perform optical communication with at least one second ONU corresponding to a second transmission rate different from the first transmission rate, the second transceiver being connected to the at least one second ONU via an optical fiber; a power supply configured to supply electrical power; a first transceiver control unit configured to supply the electrical power supplied by the power supply to the first transceiver and control the first transceiver; a second transceiver control unit configured to supply the electrical power supplied by the power supply to the second transceiver and control the second transceiver; and a device control unit configured to turn off power to the first transceiver by causing the first transceiver control unit to stop power supply to the first transceiver during a first period when the number of the at least one first ONU falls below a predetermined number, and to turn off power to the second transceiver by causing the second transceiver control unit to stop power supply to the second transceiver during a second period when the number of the at least one second ONU falls below a predetermined number.

An optical communications system according to an aspect of the disclosure includes: at least one first ONU corresponding to a first transmission rate; at least one second ONU corresponding to a second transmission rate different from the first transmission rate; and an optical-line terminating device, wherein, the optical-line terminating device includes: a first transceiver configured to perform optical communication with the at least one first ONU, the first transceiver being connected to the at least one first ONU via an optical fiber; a second transceiver configured to perform optical communication with the at least one second ONU, the second transceiver being connected to the at least one second ONU via an optical fiber; a power supply configured to supply electrical power; a first transceiver control unit configured to supply the electrical power supplied by the power supply to the first transceiver and control the first transceiver; a second transceiver control unit configured to supply the electrical power supplied by the power supply to the second transceiver and control the second transceiver; and a device control unit configured to turn off power to the first transceiver by causing the first transceiver control unit to stop power supply to the first transceiver during a first period when the number of the at least one first ONU falls below a predetermined number, and to turn off power to the second transceiver by causing the second transceiver control unit to stop power supply to the second transceiver during a second period when the number of the at least one second ONU falls below a predetermined number.

Effects of the Invention

According to one or more aspects of the disclosure, power can be saved by turning off the power to a section that performs a transmitting and receiving function at a specific rate when the transmitting and receiving function is not being used.

MODE FOR CARRYING OUT THE INVENTION

First Embodiment

Figure 1:
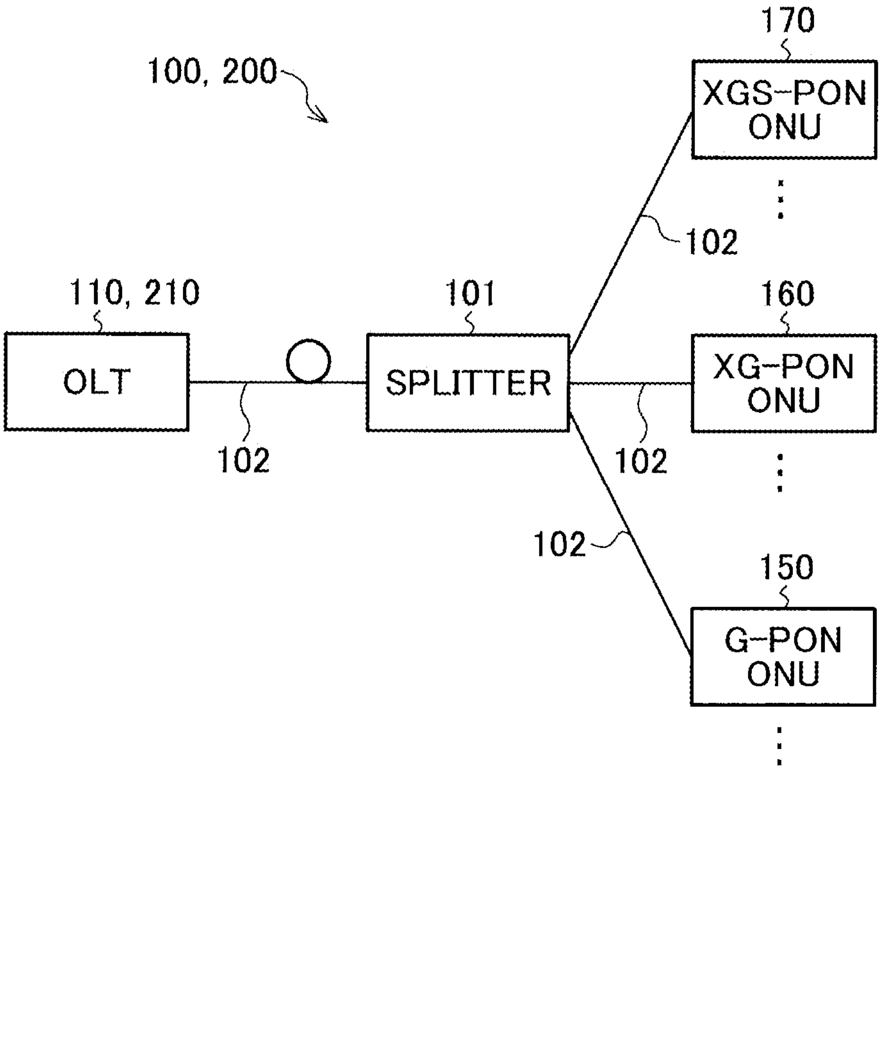
FIG. 1 is a block diagram schematically illustrating a configuration of an optical communications system according to first and second embodiments.

FIG. 1 is a block diagram schematically illustrating a configuration of an optical communications system 100 according to the first embodiment.

The optical communications system 100 includes an OLT 110 as an optical-line terminating device and several types of ONUs: G-PON ONUs 150, XG-PON ONUs 160, and XGS-PON ONUs 170.

Here, the G-PON ONUs 150, the XG-PON ONUs 160, and the XGS-PON ONUs 170 are connected to the OLT 110 via a splitter 101.

In the first embodiment, three types of ONUs corresponding to different transmission rates are included in the optical communications system 100, but the types of ONUs are not limited to three.

The G-PON ONUs 150 support transmission rates of 1 Gbps uplink and 2.5 Gbps downlink. The XG-PON ONUs 160 support transmission rates of 2.5 Gbps uplink and 10 Gbps downlink. The XGS-PON ONUs 170 support transmission rates of 10 Gbps uplink and 10 Gbps downlink.

The OLT 110 transmits optical signals to the G-PON ONUs 150, the XG-PON ONUs 160, or the XGS-PON ONUs 170. The optical signals transmitted by the OLT 110 to the G-PON ONUs 150, the XG-PON ONUs 160, or the XGS-PON ONUs 170 are also referred to as downlink signals. Optical signals transmitted by the G-PON ONUs 150, the XG-PON ONUs 160, or the XGS-PON ONUs 170 to the OLT 110 are also referred to as uplink signals.

In the first embodiment, when there is an opening in the transmission timings of uplink signals from the G-PON ONUs 150, the XG-PON ONUs 160, or the XGS-PON ONUs 170 to the OLT 110 depending on the actual installation and commercial conditions of optical fibers 102, the OLT 110 turns off the power to the sections that perform transmitting and receiving functions corresponding to transmission rates other than the transmission rate of the ONUs from which signals are to be transmitted, and when the reception timings of these sections arrive, the OLT 110 turns on the power to these sections that perform a transmitting and receiving function corresponding to the other transmission rates again. In other words, in the first embodiment, the OLT 110 saves power by turning on the power to a section that performs the transmitting and receiving function corresponding to a specific transmission rate only at the transmission and reception timings for that specific transmission rate. This is explained below.

Figure 2:
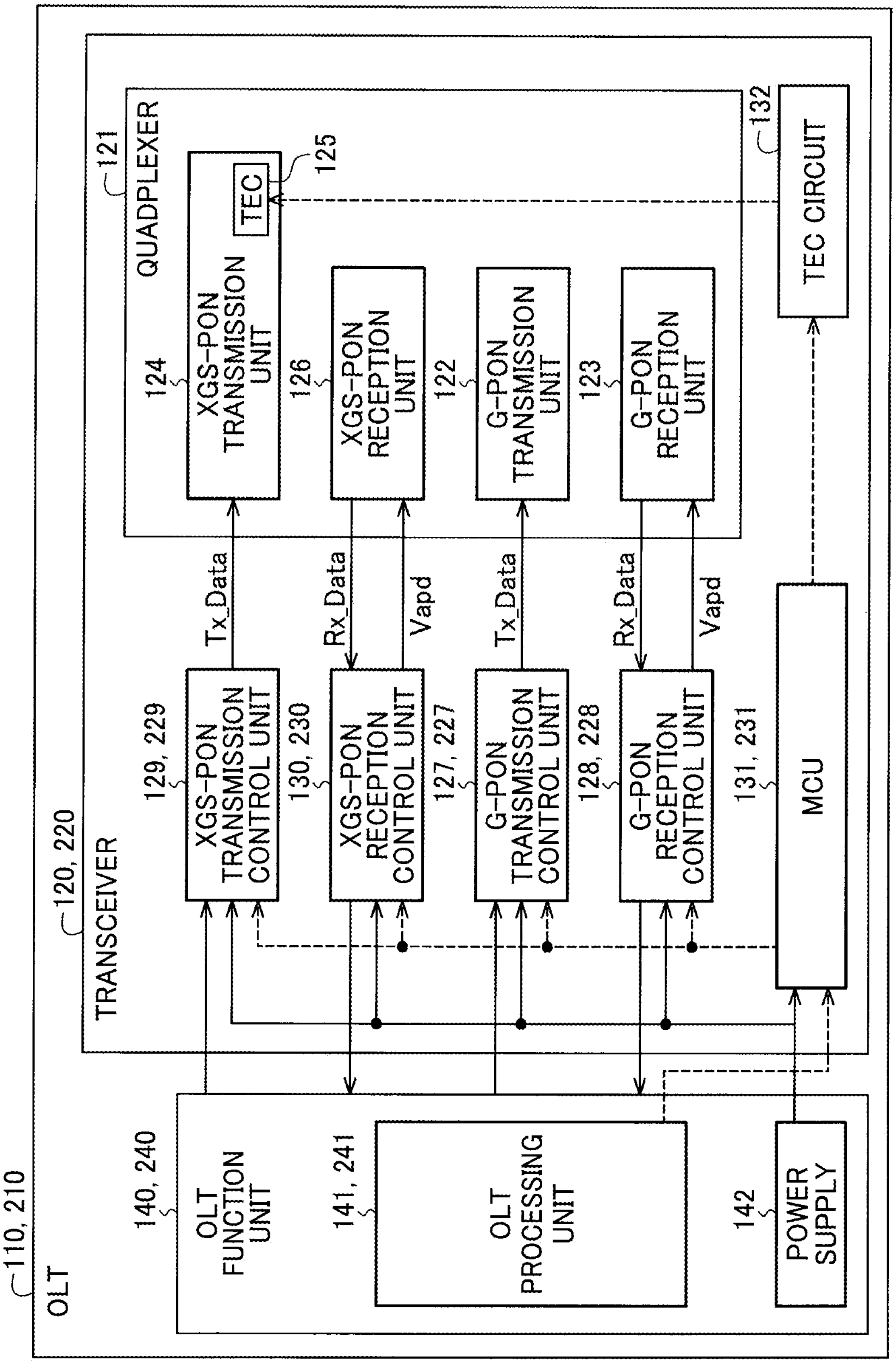
FIG. 2 is a block diagram schematically illustrating a configuration of an OLT according to the first and second embodiments.

FIG. 2 is a block diagram schematically illustrating a configuration of the OLT 110.

The OLT 110 includes a transceiver 120 as an optical transceiver unit and an OLT function unit 140.

The transceiver 120 receives power from the OLT function unit 140 and transmits and receives optical signals in response to control by the OLT function unit 140.

The transceiver 120 includes a quadplexer 121 as a transceiver executing unit, a G-PON transmission control unit 127, a G-PON reception control unit 128, an XGS-PON transmission control unit 129, an XGS-PON reception control unit 130, a main control unit (MCU) 131, and a thermoelectric cooler (TEC) circuit 132.

The quadplexer 121 includes a G-PON transmission unit 122, a G-PON reception unit 123, an XGS-PON transmission unit 124, and an XGS-PON reception unit 126.

The G-PON transmission unit 122 receives drive current from the G-PON transmission control unit 127 to convert electrical signals indicating data from the G-PON transmission control unit 127 into optical signals, and transmits these optical signals. The transmitted optical signals are received by the G-PON ONUs 150 via the corresponding optical fiber 102.

The G-PON reception unit 123 receives voltage from the G-PON reception control unit 128 to convert optical signals received from the G-PON ONUs 150 into electrical signals, and transmits these electrical signals to the G-PON reception control unit 128.

The XGS-PON transmission unit 124 receives drive current from the XGS-PON transmission control unit 129 to convert electrical signals, or data, from the XGS-PON transmission control unit 129 into optical signals, and transmits these optical signals. The transmitted optical signals are transmitted to the XG-PON ONUs 160 and the XGS-PON ONUs 170 via the optical fibers 102.

The XGS-PON transmission unit 124 includes a thermoelectric cooler (TEC) 125, which is a thermoelectric cooler using a Peltier element.

The XGS-PON reception unit 126 receives voltage from the XGS-PON reception control unit 130 to convert the optical signals received from the XG-PON ONUs 160 and the XGS-PON ONUs 170 into electrical signals, and transmits these electrical signals to the XGS-PON reception control unit 130.

Here, the G-PON transmission unit 122 and the G-PON reception unit 123 are connected to the G-PON ONUs 150, which is at least one first ONU corresponding to a first transmission rate, by the corresponding optical fiber 102, and function as a first transceiver that performs optical communication with the at least one first ONU. The first transmission rate here is 1 Gbps uplink and 2.5 Gbps downlink.

Here, the XGS-PON transmission unit 124 and the XGS-PON reception unit 126 are connected to the XG-PON ONUs 160 or the XGS-PON ONUs 170, which is at least one second ONU corresponding to a second transmission rate different from the first transmission rate, by the corresponding optical fiber 102, and function as a second transceiver that performs optical communication with the at least one second ONU. The second transmission rate here is 2.5 Gbps uplink and 10 Gbps downlink, or 10 Gbps uplink and 10 Gbps downlink.

The G-PON transmission control unit 127 supplies drive current to the G-PON transmission unit 122 and stops the drive current to the G-PON transmission unit 122 in accordance with instructions from the MCU 131.

The G-PON transmission control unit 127 gives an electrical signal Tx Data from the OLT function unit 140 to the G-PON transmission unit 122.

The G-PON reception control unit 128 supplies voltage Vapd to the G-PON reception unit 123 and stops the voltage Vapd to the G-PON reception unit 123 in accordance with instructions from the MCU 131.

The G-PON reception control unit 128 controls the amplitude of an electrical signal Rx_Data from the G-PON reception unit 123 at a constant value and forwards the controlled electrical signal to the OLT function unit 140.

The XGS-PON transmission control unit 129 supplies drive current to the XGS-PON transmission unit 124 and stops the drive current to the XGS-PON transmission unit 124 in accordance with instructions from the MCU 131.

The XGS-PON transmission control unit 129 gives the electrical signal Tx Data from the OLT function unit 140 to the XGS-PON transmission unit 124.

The XGS-PON reception control unit 130 supplies voltage Vapd to the XGS-PON reception unit 126 and stops the voltage Vapd to the XGS-PON reception unit 126 in accordance with instructions from the MCU 131.

The XGS-PON reception control unit 130 controls the amplitude of an electrical signal Rx_Data from the XGS-PON reception unit 126 at a constant value and forwards the controlled electrical signal to the OLT function unit 140.

Here, the G-PON transmission control unit 127 and the G-PON reception control unit 128 function as a first transceiver control unit that supplies power from a power supply 142 described later to the first transceiver to control the first transceiver.

Here, the XGS-PON transmission control unit 129 and the XGS-PON reception control unit 130 function as a second transceiver control unit that supplies power from the power supply 142 to the second transceiver to control the second transceiver.

The MCU 131 communicates with the OLT function unit 140, the G-PON transmission control unit 127, the G-PON reception control unit 128, the XGS-PON transmission control unit 129, and the XGS-PON reception control unit 130 in accordance with an I2C interface.

The MCU 131 then cause the G-PON transmission control unit 127, the G-PON reception control unit 128, the XGS-PON transmission control unit 129, and the XGS-PON reception control unit 130 to turn on or off the power to the G-PON transmission unit 122, the G-PON reception unit 123, the XGS-PON transmission unit 124, and the XGS-PON reception unit 126, respectively, in accordance with instructions from the OLT function unit 140.

Moreover, the MCU 131 turns on or off the power to the TEC circuit 132 by supplying power to the TEC circuit 132 or stopping the power supply to the TEC circuit 132 in accordance with instructions from the OLT function unit 140. This also stops the operation of the TEC 125 controlled by the TEC circuit 132 to turn off the power to the TEC 125.

The TEC circuit 132 supplies current to the TEC 125 of the XGS-PON transmission unit 124 to control the XGS-PON transmission unit 124 at a constant temperature.

The OLT function unit 140 is a section that comprehensively runs the OLT 110.

The OLT function unit 140 includes an OLT processing unit 141 and the power supply 142.

The OLT processing unit 141 functions as a device control unit that controls processing at the OLT 110.

For example, the OLT processing unit 141 gives the data to be transmitted to the G-PON ONUs 150 to the G-PON transmission control unit 127 and causes the G-PON transmission control unit 127 to transmit the data to the G-PON ONUs 150 via the G-PON transmission unit 122.

The OLT processing unit 141 receives data from the G-PON ONUs 150 from the G-PON reception control unit 128 and processes this data.

Moreover, the OLT processing unit 141 gives the data to be transmitted to the XG-PON ONUs 160 or the XGS-PON ONUs 170 to the XGS-PON transmission control unit 129 and causes the XGS-PON transmission control unit 129 to transmit the data to the XG-PON ONUs 160 or the XGS-PON ONUs 170 via the XGS-PON transmission unit 124.

The OLT processing unit 141 receives the data from the XG-PON ONUs 160 or the XGS-PON ONUs 170 from the XGS-PON reception control unit 130 and processes this data.

The OLT function unit 140 includes the power supply 142 that supplies power to the components of the OLT 110, and the OLT processing unit 141 controls the power supplied to the components of the OLT 110 via the MCU 131.

For example, when the number of G-PON ONUs 150 connected to the OLT 110 is less than a predetermined number, the OLT processing unit 141 determines that the communication frequency with the G-PON ONUs 150 is low and turns off the power to the G-PON transmission unit 122 and the G-PON reception unit 123, which are function units that communicate with the G-PON ONUs 150, except during a period of communication with the G-PON ONUs 150 and a period of preparation for communication with the G-PON ONUs 150.

When the number of XG-PON ONUs 160 and XGS-PON ONUs 170 connected to the OLT 110 is less than a predetermined number, the OLT processing unit 141 determines that the communication frequency with the XG-PON ONUs 160 and the XGS-PON ONUs 170 is low and turns off power to the XGS-PON transmission unit 124 and the XGS-PON reception unit 126, which are function units that communicate with the XG-PON ONUs 160 or the XGS-PON ONU 170, except during a period of communication with the XG-PON ONUs 160 or the XGS-PON ONUs 170 and a period of preparation for communication with the XG-PON ONUs 160 and the XGS-PON ONUs 170. In this case, the OLT processing unit 141 also turns off the power to the TEC circuit 132.

The power supply 142 supplies power to the components of the OLT 110.

For example, the power supply 142 supplies power to the G-PON transmission control unit 127, the G-PON reception control unit 128, the XGS-PON transmission control unit 129, the XGS-PON reception control unit 130, and the MCU 131.

Figure 3A:
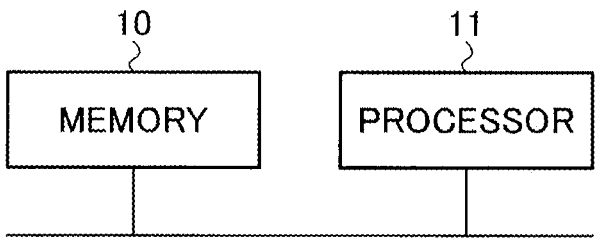
FIGS. 3A and 3B are block diagrams illustrating hardware configuration examples.

The OLT processing unit 141 described above can be implemented by, for example, a memory 10 and a processor 11 such as a central processing unit (CPU) that executes a program stored in the memory 10, as illustrated in FIG. 3A. Such programs may be provided over a network or may be recorded and provided on a recording medium. That is, such programs may be provided, for example, as a program product.

Figure 3B:
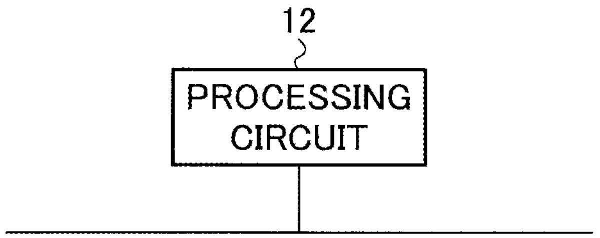

The OLT processing unit 141 can also be implemented by a processing circuit 12 such as a single circuit, a composite circuit, a processor operated by a program, a parallel processor operated by a program, an application specific integrated circuit (ASIC) or a field programmable gate array (FPGA) as illustrated in FIG. 3B.

As described above, the OLT processing unit 141 can be implemented by processing circuitry.

The power supply 142 can be implemented by a power supply circuit (not illustrated).

The G-PON transmission unit 122, the G-PON reception unit 123, the XGS-PON transmission unit 124, the XGS-PON reception unit 126, the G-PON transmission control unit 127, the G-PON reception control unit 128, the XGS-PON transmission control unit 129, the XGS-PON reception control unit 130, the MCU 131, and the TEC circuit 132 can be implemented by, for example, processing circuitry such as a processing circuit 12 illustrated in FIG. 3B.

Figure 4:
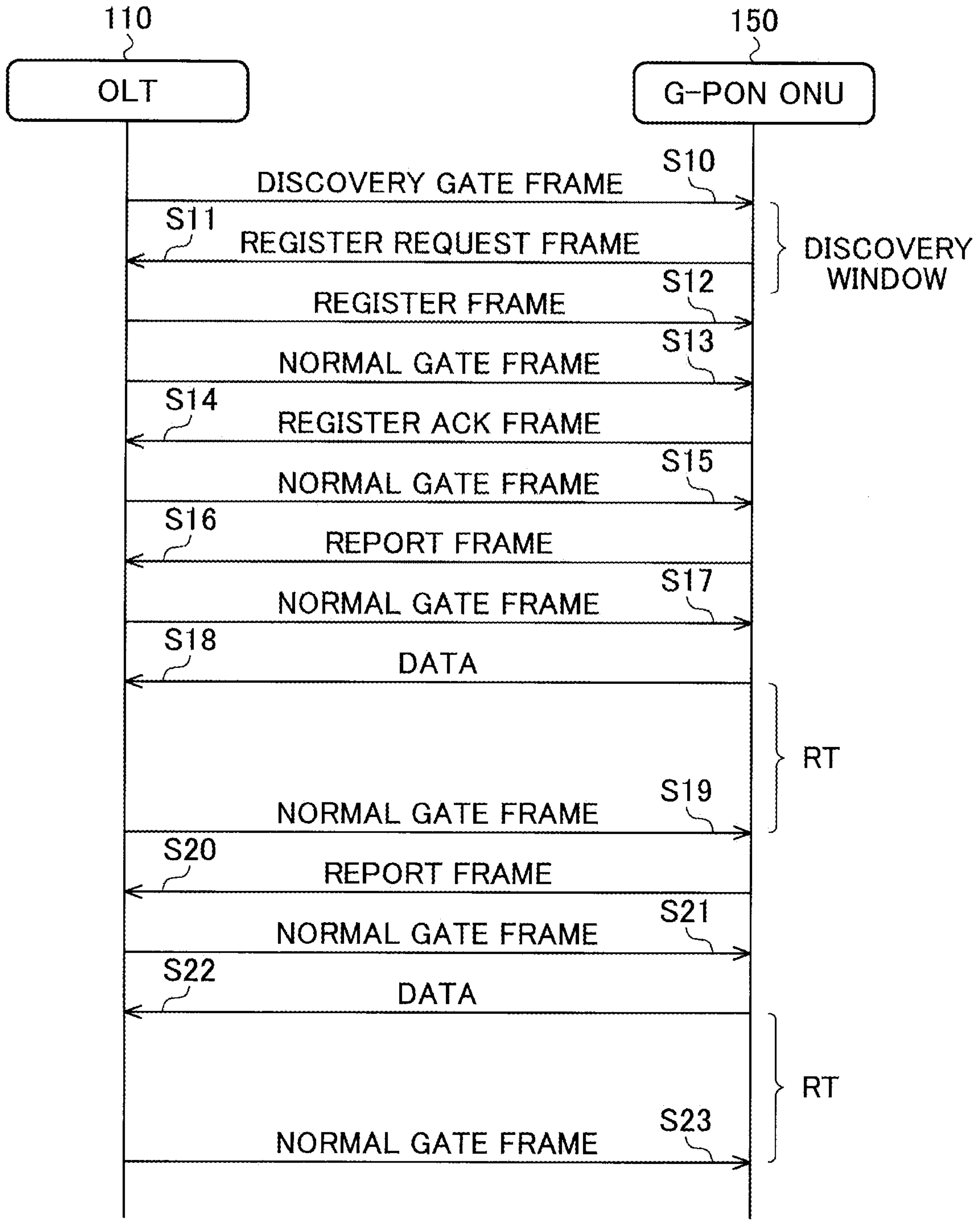
FIG. 4 is a sequence diagram used to explain operation of the optical communications system according to the first embodiment.

FIG. 4 is a sequence diagram used to explain operation of the optical communications system 100 according to the first embodiment.

FIG. 4 illustrates an example in which the G-PON ONUs 150, which are low-speed ONUs, are gradually replaced by the XG-PON ONUs 160 or XGS-PON ONUs 170, which are high-speed ONUs, and the number of G-PON ONUs 150 connected to the optical communications system 100 falls below a predetermined number (two, in this example).

In other words, FIG. 4 illustrates the operation of turning off the power to a section in the transceiver 120 that performs a low-speed optical transmitting and receiving function during a time when communication is not being performed, and turning on the power only during a time when communication is being performed and a preparation time required to turn on the power, when the communication frequency of the low-speed ONUs is low.

First, the OLT processing unit 141 causes the transceiver 120 to transmit a Discovery Gate frame to logically establish a link between the OLT 110 and the ONUs (step S10).

Specifically, the XGS-PON transmission control unit 129 or the G-PON transmission control unit 127 amplifies the electrical signal serving as the Discovery Gate frame and then transmits it to the XGS-PON transmission unit 124 or the G-PON transmission unit 122. The XGS-PON transmission unit 124 or the G-PON transmission unit 122 converts the received electrical signal into an optical signal and transmits it to the ONUs via the corresponding optical fiber 102. A link is established when an ONU with an unestablished link responds to this Discovery Gate frame within a certain amount of time. The certain amount of time here is referred to as a discovery window.

In this way, the OLT processing unit 141 discovers link-unestablished ONUs and repeats the link establishment operation by periodically transmitting a Discovery Gate frame. This allows the OLT processing unit 141 to grasp the number of connected ONUs of each type.

When a G-PON ONUs 150 receives the Discovery Gate frame, the G-PON ONU 150 transmit a Register Request frame within the Discovery window time (step S11).

The G-PON reception unit 123 converts the optical signal that is the Register Request frame into an electrical signal, and the G-PON reception control unit 128 receives this electrical signal from the G-PON reception unit 123 and gives it to the OLT processing unit 141. Hereafter, the process in the OLT 110 when frames are received from a G-PON ONU 150 is the same.

By successfully receiving the Register Request frame, the OLT processing unit 141 discovers the G-PON ONU 150 and causes the G-PON transmission control unit 127 and the G-PON transmission unit 122 to transmit the Register frame (step S12). The Register frame is used to assign a logical link identifier (LLID) to the G-PON ONU 150.

Specifically, the G-PON transmission control unit 127 amplifies the electrical signal that is the Register frame and then gives the amplified electrical signal to the G-PON transmission unit 122; and the G-PON transmission unit 122 converts this electrical signal into an optical signal and transmits it to the G-PON ONU 150 via the corresponding optical fiber 102. Hereafter, the process in the OLT 110 when frames are transmitted to the G-PON ONU 150 is the same.

When the G-PON ONU 150 receives the Register frame, it checks the LLID and henceforth is able to determine whether or not the data was sent to the G-PON ONU 150.

Next, the OLT processing unit 141 causes the G-PON transmission control unit 127 and the G-PON transmission unit 122 to transmit a Normal Gate frame (step S13). The Normal Gate frame is used to inform the G-PON ONU 150 of a transmission start time. The transmission start time is the time when the G-PON ONU 150 is allowed to start transmission.

When the G-PON ONU 150 receives the Normal Gate frame, the G-PON ONU 150 transmits a Register ACK frame at the transmission start time included in the Normal Gate frame (step S14).

By receiving the Register ACK frame, the OLT processing unit 141 completes the registration of the LLID assigned to the G-PON ONU 150. This establishes a logical link between the OLT 110 and the G-PON ONU 150.

The OLT processing unit 141 then causes the G-PON transmission control unit 127 and the G-PON transmission unit 122 to transmit a Normal Gate frame to inform the G-PON ONU 150 of the transmission start time (step S15).

When the G-PON ONU 150 receives this Normal Gate frame, the G-PON ONU 150 transmits the amount of data accumulated in the G-PON ONU 150 as a Report frame at the transmission start time included in the Normal Gate frame (step S16). Here, the amount of data is also referred to as transmission request data volume.

The OLT processing unit 141 causes the G-PON transmission control unit 127 and the G-PON transmission unit 122 to transmit a Normal Gate frame to announce the transmission start time and bandwidth of the uplink signal (step S17). The OLT processing unit 141 also stores the transmission halt period RT of the G-PON ONU 150 in this Normal Gate frame. Moreover, the OLT processing unit 141 instructs the MCU 131 to turn off the power to the G-PON transmission unit 122 and the G-PON reception unit 123 of the transceiver 120 during the transmission halt period RT. Upon receiving such an instruction, the MCU 131 instructs the G-PON transmission control unit 127 and the G-PON reception control unit 128 to turn off the power to the G-PON transmission unit 122 and the G-PON reception unit 123 by stopping the power supply.

Here, the transmission halt period RT is longer the fewer the number of ONU connections of a specific type. In the example in FIG. 4, the fewer the number of G-PON ONUs 150 connected to the OLT 110, the longer the transmission halt period RT.

Specifically, RT1>RT2, where RT1 is the transmission halt period when one G-PON ONU 150 is connected to the OLT 110 and RT2 is the transmission halt period when two G-PON ONUs 150 are connected to the OLT 110.

The G-PON ONU 150 transmits data at the transmission start time included in the Normal Gate frame (step S18). The G-PON ONU 150 then halts transmission upon completion of transmission of the data on the transmission request data volume and waits for the next allocated transmission start time. Here, the G-PON ONU 150 halts transmission during the transmission halt period RT after completion of the transmission at the transmission start time notified by the Normal Gate frame, until the next transmission start time is instructed.

When the OLT 110 completes the reception of the data on the transmission request data volume in step S16, the MCU 131 turns off the power to the G-PON transmission control unit 127 and the G-PON reception control unit 128 during the transmission halt period RT.

Next, after the transmission halt period RT has passed, the OLT processing unit 141 causes the G-PON transmission control unit 127 and the G-PON transmission unit 122 to transmit a Normal Gate frame to notify the G-PON ONU 150 of the transmission start time (step S19). In this case, the OLT processing unit 141 instructs the MCU 131 to turn on the power to the G-PON transmission unit 122 and the G-PON reception unit 123 of the transceiver 120 after the transmission halt period RT. Upon receiving such an instruction, the MCU 131 instructs the G-PON transmission control unit 127 and the G-PON reception control unit 128 to resume the power supply to the G-PON transmission unit 122 and the G-PON reception unit 123.

When the G-PON ONU 150 receives the Normal Gate frame, the G-PON ONU 150 transmits the amount of data accumulated in the G-PON ONU 150 as a Report frame at the transmission start time included in the Normal Gate frame (step S20).

The OLT processing unit 141 causes the G-PON transmission control unit 127 and the G-PON transmission unit 122 to transmit a Normal Gate frame to announce the transmission start time and bandwidth of the uplink signal (step S21). The OLT processing unit 141 also stores the transmission halt period RT of the G-PON ONU 150 in this Normal Gate frame. Moreover, the OLT processing unit 141 instructs the MCU 131 to turn off the power to the G-PON transmission unit 122 and the G-PON reception unit 123 of the transceiver 120 during the transmission halt period RT.

The G-PON ONU 150 transmits data at the transmission start time included in the Normal Gate frame (step S22). The G-PON ONU 150 then halts transmission upon completion of transmission of the data on the transmission request data volume and waits for the next allocated transmission start time. Here, the G-PON ONU 150 halts transmission during the transmission halt period RT after completion of the transmission at the transmission start time notified by the Normal Gate frame, until the next transmission start time is instructed.

When the OLT 110 completes reception of the data on the transmission request data volume in step S20, the MCU 131 instructs the G-PON transmission control unit 127 and the G-PON reception control unit 128 during the transmission halt period RT to turn off the power to the G-PON transmission unit 122 and the G-PON reception unit 123.

Next, after the transmission halt period RT has passed, the OLT processing unit 141 causes the G-PON transmission control unit 127 and the G-PON transmission unit 122 to transmit a Normal Gate frame to notify the G-PON ONU 150 of the transmission start time (step S23). In this case, the OLT processing unit 141 instructs the MCU 131 to turn on the power to the G-PON transmission unit 122 and the G-PON reception unit 123 of the transceiver 120 after the transmission halt period RT. Upon receiving such an instruction, the MCU 131 causes the G-PON transmission control unit 127 and the G-PON reception control unit 128 to resume the power supply to the G-PON transmission unit 122 and the G-PON reception unit 123 to turn the power on.

With reference to FIG. 4, the operation when the number of G-PON ONUs 150 connected to the OLT 110 falls below a predetermined number has been described; however, the first embodiment is not limited to such an example. For example, when the number of XG-PON ONUs 160 and XGS-PON ONUs 170 connected to the OLT 110 falls below a predetermined number, the OLT processing unit 141 may turn off the power to the XGS-PON transmission unit 124 and the XGS-PON reception unit 126 by operation similar to that in FIG. 4.

As described above, when the number of at least one first ONUs falls below a predetermined number, the OLT processing unit 141 causes the first transceiver control unit to stop the power supply to the first transceiver during a first period to turn off the power to the first transceiver.

When the number of at least one second ONUs falls below a predetermined number, the OLT processing unit 141 causes the second transceiver control unit to stop the power supply to the second transceiver during a second period to turn off the power to the second transceiver.

Here, the OLT processing unit 141 specifies the number of the at least one first ONU through a response to the Discovery Gate frame by the at least one first ONU and specifies the number of the at least one second ONU through a response to the Discovery Gate frame from the at least one second ONU.

The first period is a time period starting at the completion of data transmission to the first transceiver by the at least one first ONU, and the second period is a time period starting at the completion of data transmission to the second transceiver by the at least one second ONU.

The OLT processing unit 141 then notifies the at least one first ONU of the first period through the Normal Gate frame to halt communication during the first period. The OLT processing unit 141 notifies the at least one second ONU of the second period through the Normal Gate frame to halt communication during that second period.

The first period is longer for a smaller number of the at least one first ONU, and the second period is longer for a smaller number of the at least one second ONU.

As explained above, according to the first embodiment, power can be saved because the transceiver 120 turns on the power to only the sections that perform the transmitting and receiving function of the transmission rate being operated.

Second Embodiment

Optical transceivers provided in an OLT and ONUs are classified into a plurality of classes depending on the loss budget determined by transmission loss and branching loss between the OLT and the ONUs. Specifically, when the loss budget is below 28 dB, the classification is class B+, and when the loss budget is below 32 dB, the classification is class C+, according to ITU-T G.984.2.

As the loss budget increases, higher optical transmission power and optical reception sensitivity are required for both the OLT and the ONUs. This increases the power consumption of the optical transceiver.

On the other hand, even on an optical fiber network that requires a class C+ classification, not all ONUs are located where a class C+ loss budget is required, and it is normal for multiple ONUs to be located at positions of a loss budget of below 28 dB, which is specified as class B+.

Immediately after the introduction of a high-speed ONU, if high-speed ONUs do not exist in the class C+ area and exist only in the class B+ area, the high-speed transmitting and receiving function in the transceiver is set to a drive current setting value to achieve optical output power and reception sensitivity equivalent to class B+.

In contrast, when the introduction of high-speed ONUs progresses sufficiently, and there are no more low-speed ONUs in the class C+ area, the low-speed transmitting and receiving function in the transceiver are set to drive current setting values to achieve optical output power and reception sensitivity equivalent to class B+.

In addition to the functions described above in the first embodiment, the second embodiment achieves power saving by class adjustment in accordance with the loss budget when ONUs are installed close to the OLT or when the transmission loss and branching loss are small, depending on the installation environment or commercial conditions of the MPM PON. Furthermore, power saving is achieved by controlling the power to the TEC circuit.

As illustrated in FIG. 1, an optical communications system 200 according to the second embodiment includes an OLT 210 and several types of ONUs: G-PON ONUs 150, XG-PON ONUs 160, and XGS-PON ONUs 170.

The G-PON ONUs 150, the XG-PON ONUs 160, and the XGS-PON ONUs 170 according to the second embodiment are respectively the same as the G-PON ONUs 150, the XG-PON ONUs 160, and the XGS-PON ONUs 170 according to the first embodiment.

As illustrated in FIG. 2, the OLT 210 according to the second embodiment includes a transceiver 220 as an optical transceiver unit and an OLT function unit 240.

The transceiver 220 receives power from the OLT function unit 240 and transmits and receives optical signals in response to control by the OLT function unit 240.

The transceiver 220 includes a quadplexer 121, a G-PON transmission control unit 227, a G-PON reception control unit 228, an XGS-PON transmission control unit 229, an XGS-PON transmission control unit 230, an MCU 231, and a TEC circuit 132.

The quadplexer 121 and the TEC circuit 132 of the transceiver 220 according to the second embodiment are respectively the same as the quadplexer 121 and the TEC circuit 132 of the transceiver 120 according to the first embodiment.

The G-PON transmission control unit 227 performs the same process as the G-PON transmission control unit 127 according to the first embodiment and also adjusts the drive current supplied to the G-PON transmission unit 122 in accordance with an instruction from the MCU 231.

The G-PON reception control unit 228 performs the same process as the G-PON reception control unit 128 according to the first embodiment and also adjusts the voltage Vapd supplied to the G-PON reception unit 123 in accordance with an instruction from the MCU 231.

The XGS-PON transmission control unit 229 performs the same process as the XGS-PON transmission control unit 129 according to the first embodiment and also adjusts the drive current supplied to the XGS-PON transmission unit 124 in accordance with an instruction from the MCU 231.

The XGS-PON transmission control unit 230 performs the same process as the XGS-PON reception control unit 130 according to the first embodiment and also adjusts the voltage Vapd supplied to the XGS-PON reception unit 126 in accordance with an instruction from the MCU 231.

Similar to the first embodiment, the MCU 231 communicates with the OLT function unit 240, the G-PON transmission control unit 227, the G-PON reception control unit 228, the XGS-PON transmission control unit 229, and the XGS-PON transmission control unit 230 in accordance with an I2C interface.

Here, in the second embodiment, in accordance with instructions from the OLT function unit 240, the MCU 231 causes the G-PON transmission control unit 127 or the XGS-PON transmission control unit 129 to adjust the drive current to be supplied and causes the G-PON reception control unit 128 or the XGS-PON reception control unit 130 to adjust the voltage to be supplied.

Moreover, the MCU 231 turns on or off the power to the TEC circuit 132 by supplying power to the TEC circuit 132 or stopping the power supply to the TEC circuit 132 in accordance with instructions from the OLT function unit 240.

The OLT function unit 240 is a section that comprehensively runs the OLT 110.

The OLT function unit 240 includes an OLT processing unit 241 and the power supply 142.

The power supply 142 of the OLT function unit 240 according to the second embodiment is the same as the power supply 142 of the OLT function unit 140 according to the first embodiment.

The OLT processing unit 241 controls processing at the OLT 210.

The OLT processing unit 241 according to the second embodiment performs the same process as the OLT processing unit 141 according to the first embodiment and also adjusts the classes of the ONUs in accordance with the installation locations of the ONUs or the transmission loss and branching loss.

Figure 5:
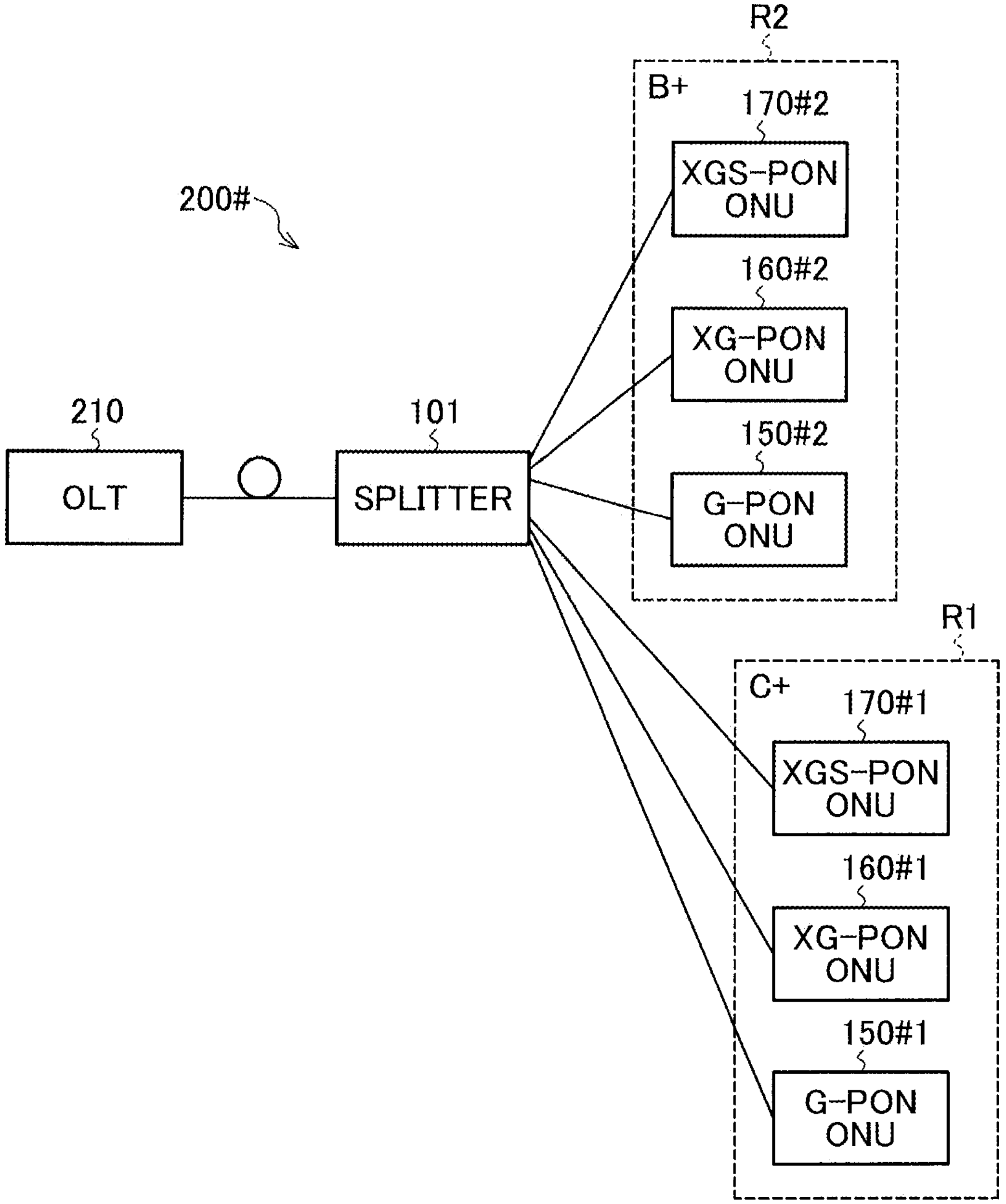
FIG. 5 is a block diagram illustrating a placement example of an optical communications system according to the second embodiment.

Specifically, as in an optical communications system 200 #illustrated in FIG. 5, when a G-PON ONU 150 #1, an XG-PON ONU 160 #1, and an XGS-PON ONU 170 #1 are installed in a C+ area R1, and a G-PON ONU 150 #2, an XG-PON ONU 160 #2, and an XGS-PON ONU 170 #2 are installed in a B+ area R2, the transceiver 220 of the OLT 210 waits with optical transmission power and optical reception sensitivity corresponding to the requested class C+.

When the G-PON ONU 150 #1, the XG-PON ONU 160 #1, and the XGS-PON ONU 170 #1 installed in C+ area R1 are all removed due to a change in commercial conditions, or when the G-PON ONU 150 #1, the XG-PON ONU 160 #1, and the XGS-PON ONU 170 #1 are reinstalled in the B+ area R2, the distances between the OLT 210 and the G-PON ONU 150 #1, XG-PON ONU 160 #1, and XGS-PON ONU 170 #1 are shortened.

In such cases, the OLT processing unit 241 detects the distances to the connected ONUs by performing a measurement sequence according to, for example, a multi-point control protocol (MPCP).

When the OLT processing unit 241 determines that the connected ONUs are not class C+ but in class B+, the OLT processing unit 241 instructs the MCU 231 to adjust the drive current applied to the XGS-PON transmission unit 124 and the G-PON transmission unit 122 and set the transmission power to optimum class B+. The OLT processing unit 241 instructs the MCU 231 to adjust the voltage provided to the XGS-PON reception unit 126 and the G-PON reception unit 123 to change the reception sensitivity to the optimal B+ class.

Moreover, when the OLT processing unit 241 determines that the XGS-PON ONU 170 and the XG-PON ONU 160 are not installed on the basis of a response to the DISCOVERY GATE frame described above, the OLT processing unit 241 instructs the MCU 231 to turn off the power to the XGS-PON transmission unit 124 and also turn off the power to the TEC circuit 132.

As described above, in the second embodiment, the OLT processing unit 241 performs a first classification process to classify each of at least one first ONU into one of a plurality of classes in accordance with loss budget by detecting the distance to the at least one first ONU, and adjusts the optical transmission power and the optical reception sensitivity of a first transceiver in accordance with the result of the first classification process.

The OLT processing unit 241 performs a second classification process to classify each of at least one second ONU into one of a plurality of classes in accordance with loss budget by detecting the distance to the at least one second ONU, and adjusts the optical transmission power and the optical reception sensitivity of a second transceiver in accordance with the result of the second classification process.

Here, a second transmission rate is a rate higher than a first transmission rate. When the at least one second ONU is not connected to the second transceiver via an optical fiber, the OLT processing unit 241 causes the second transceiver control unit to stop the power supply to the second transceiver to turn off the power to the second transceiver.

The second transceiver includes a TEC 125, or a temperature regulating unit that regulates the temperature of the second transceiver, and the OLT processing unit 241 also stops the operation of the temperature regulating unit when the power of the second transceiver is turned off.

As described above in the second embodiment, it is possible to save power while being compatible with the installation area because classes are controlled in accordance with loss budget. The second embodiment can also save power before an upgrade to a 10 G rate by turning off the power to the TEC circuit 132 depending on the type of connected ONUs.

The first and second embodiments described above include the G-PON transmission unit 122 and the G-PON reception unit 123, which communicate with the G-PON ONUs 150, and the XGS-PON transmission unit 124 and the XGS-PON reception unit 126, which communicate with the XG-PON ONUs 160 and the XGS-PON ONUs 170; however, the first and second embodiments are not limited to these examples. For example, an XG-PON transmission unit and an XG-PON reception unit that communicate with the XG-PON ONUs 160 may be provided. In such a case, the XGS-PON transmission unit 124 and the XGS-PON reception unit 126 communicates with the XGS-PON ONUs 170 without communicating with the XG PON ONUs 160. When the number of connected XG-PON ONUs 160 is less than a predetermined number, the OLT processing units 141 and 241 cause the power to the XG-PON transmission unit and the XG-PON reception unit to be turned off in the same manner as above, and when the number of connected XGS-PON ONUs 170 is less than a predetermined number, the power to the XGS-PON transmission unit 124 and the XGS-PON reception unit 126 should be turned off in the same manner as above.

DESCRIPTION OF REFERENCE CHARACTERS

100, 200, optical communications system; 101 splitter; 102 optical fiber; 110, 210 OLT; 120, 220 transceiver; 121 quadplexer; 127, 227 G-PON transmission control unit; 128, 228 G-PON reception control unit; 129, 229 XGS-PON transmission control unit; 130, 230 XGS-PON reception control unit; 131, 231 MCU; 132 TEC circuit; 140, 240 OLT function unit; 141, 241 OLT processing unit; 142 power supply.

What is claimed is:

1. An optical-line terminating device comprising:

a first transceiver configured to perform optical communication with at least one first optical network unit (ONU) corresponding to a first transmission rate, the first transceiver being connected to the at least one first ONU via a first optical fiber;

a second transceiver configured to perform optical communication with at least one second ONU corresponding to a second transmission rate different from the first transmission rate, the second transceiver being connected to the at least one second ONU via a second optical fiber;

a power supply configured to supply electrical power; and processing circuitry comprising at least one of a processor, an application specific integrated circuit (ASIC), or a field programmable gate array (FPGA), the processing circuitry configured:

to supply the electrical power supplied by the power supply to the first transceiver and control the first transceiver;

to supply the electrical power supplied by the power supply to the second transceiver and control the second transceiver; and to turn off power to the first transceiver by stopping to supply power to the first transceiver during a first period when the number of the at least one first ONU falls below a first predetermined number, and to turn off power to the second transceiver by stopping to supply power to the second transceiver during a second period when the number of the at least one second ONU falls below a second predetermined number, wherein, the first period is a period starting at completion of data transmission to the first transceiver by the at least one first ONU, and the second period is a period starting at completion of data transmission to the second transceiver by the at least one second ONU.

2. The optical-line terminating device according to claim 1, wherein the processing circuitry specifies the number of the at least one first ONU through a response from the at least one first ONU to a Discovery Gate frame and specifies the number of the at the least one second ONU through a response from the at least one second ONU to a Discovery Gate frame.

3. An optical-line terminating device comprising:

a first transceiver configured to perform optical communication with at least one first optical network unit (ONU) corresponding to a first transmission rate, the first transceiver being connected to the at least one first ONU via a first optical fiber;

a second transceiver configured to perform optical communication with at least one second ONU corresponding to a second transmission rate different from the first transmission rate, the second transceiver being connected to the at least one second ONU via a second optical fiber;

a power supply configured to supply electrical power; and processing circuitry comprising at least one of a processor, an application specific integrated circuit (ASIC), or a field programmable gate array (FPGA), the processing circuitry configured:

to supply the electrical power supplied by the power supply to the first transceiver and control the first transceiver;

to supply the electrical power supplied by the power supply to the second transceiver and control the second transceiver; and to turn off power to the first transceiver by stopping to supply power to the first transceiver during a first period when the number of the at least one first ONU falls below a first predetermined number, and to turn off power to the second transceiver by stopping to supply power to the second transceiver during a second period when the number of the at least one second ONU falls below a second predetermined number, wherein the processing circuitry notifies the at least one first ONU of the first period with a Normal Gate frame to halt communication during the first period and notifies the at least one second ONU of the second period with a Normal Gate frame to halt communication during the second period.

4. The optical-line terminating device according to claim 1, wherein, the longer the first period becomes, the smaller the number of the at least one first ONU is, and the longer the second period becomes, the smaller the number of the at least one second ONU is.

5. An optical-line terminating device comprising:

a first transceiver configured to perform optical communication with at least one first optical network unit (ONU) corresponding to a first transmission rate, the first transceiver being connected to the at least one first ONU via a first optical fiber;

a second transceiver configured to perform optical communication with at least one second ONU corresponding to a second transmission rate different from the first transmission rate, the second transceiver being connected to the at least one second ONU via a second optical fiber;

a power supply configured to supply electrical power; and processing circuitry comprising at least one of a processor, an application specific integrated circuit (ASIC), or a field programmable gate array (FPGA), the processing circuitry configured:

to supply the electrical power supplied by the power supply to the first transceiver and control the first transceiver;

to supply the electrical power supplied by the power supply to the second transceiver and control the second transceiver; and to turn off power to the first transceiver by stopping to supply power to the first transceiver during a first period when the number of the at least one first ONU falls below a first predetermined number, and to turn off power to the second transceiver by stopping to supply power to the second transceiver during a second period when the number of the at least one second ONU falls below a second predetermined number, wherein the processing circuitry detects a distance to each of the at least one first ONU to perform a first classification process to classify each of the at least one first ONU to one of a plurality of classes corresponding to loss budget and adjusts optical transmission power and optical reception sensitivity of the first transceiver in accordance with a result of the first classification process, and detects a distance to each of the at least one second ONU to perform a second classification process to classify each of the at least one second ONU to one of the plurality of classes and adjusts optical transmission power and optical reception sensitivity of the second transceiver in accordance with a result of the second classification process.

6. The optical-line terminating device according to claim 1, wherein, the second transmission rate is a faster rate than the first transmission rate, and when the at least one second ONU is not connected to the second transceiver via the second optical fiber, the processing circuitry stops supplying power to the second transceiver to turn off power to the second transceiver.

7. The optical-line terminating device according to claim 6, wherein, the second transceiver regulates temperature of the second transceiver, and when power to the second transceiver is turned off, the processing circuitry also stops operation of regulating the temperature.

8. An optical communications system comprising:

at least one first optical network unit (ONU) corresponding to a first transmission rate;

at least one second ONU corresponding to a second transmission rate different from the first transmission rate; and an optical-line terminating device, wherein, the optical-line terminating device comprises:

a first transceiver configured to perform optical communication with the at least one first ONU, the first transceiver being connected to the at least one first ONU via a first optical fiber;

a second transceiver configured to perform optical communication with the at least one second ONU, the second transceiver being connected to the at least one second ONU via a second optical fiber;

a power supply configured to supply electrical power; and processing circuitry comprising at least one of a processor, an application specific integrated circuit (ASIC), or a field programmable gate array (FPGA), the processing circuitry configured:

to supply the electrical power supplied by the power supply to the first transceiver and control the first transceiver;

to supply the electrical power supplied by the power supply to the second transceiver and control the second transceiver; and to turn off power to the first transceiver by stopping to supply power to the first transceiver during a first period when the number of the at least one first ONU falls below a first predetermined number, and to turn off power to the second transceiver by stopping to supply power to the second transceiver during a second period when the number of the at least one second ONU falls below a second predetermined number, the first period is a period starting at completion of data transmission to the first transceiver by the at least one first ONU, and the second period is a period starting at completion of data transmission to the second transceiver by the at least one second ONU.

9. The optical-line terminating device according to claim 2, wherein, the first period is a period starting at completion of data transmission to the first transceiver by the at least one first ONU, and the second period is a period starting at completion of data transmission to the second transceiver by the at least one second ONU.

10. The optical-line terminating device according to claim 2, wherein the processing circuitry notifies the at least one first ONU of the first period with a Normal Gate frame to halt communication during the first period and notifies the at least one second ONU of the second period with a Normal Gate frame to halt communication during the second period.

11. The optical-line terminating device according to claim 1, wherein the processing circuitry notifies the at least one first ONU of the first period with a Normal Gate frame to halt communication during the first period and notifies the at least one second ONU of the second period with a Normal Gate frame to halt communication during the second period.

12. The optical-line terminating device according to claim 9, wherein the processing circuitry notifies the at least one first ONU of the first period with a Normal Gate frame to halt communication during the first period and notifies the at least one second ONU of the second period with a Normal Gate frame to halt communication during the second period.

13. The optical-line terminating device according to claim 4, wherein, the longer the first period becomes, the smaller the number of the at least one first ONU is, and the longer the second period becomes, the smaller the number of the at least one second ONU is.

14. The optical-line terminating device according to claim 9, wherein, the longer the first period becomes, the smaller the number of the at least one first ONU is, and the longer the second period becomes, the smaller the number of the at least one second ONU is.

15. The optical-line terminating device according to claim 10, wherein, the longer the first period becomes, the smaller the number of the at least one first ONU is, and the longer the second period becomes, the smaller the number of the at least one second ONU is.

16. The optical-line terminating device according to claim 11, wherein, the longer the first period becomes, the smaller the number of the at least one first ONU is, and the longer the second period becomes, the smaller the number of the at least one second ONU is.

17. The optical-line terminating device according to claim 12, wherein, the longer the first period becomes, the smaller the number of the at least one first ONU is, and the longer the second period becomes, the smaller the number of the at least one second ONU is.

18. An optical communications system comprising:

at least one first optical network unit (ONU) corresponding to a first transmission rate;

at least one second ONU corresponding to a second transmission rate different from the first transmission rate; and an optical-line terminating device, wherein, the optical-line terminating device comprises:

a first transceiver configured to perform optical communication with the at least one first ONU, the first transceiver being connected to the at least one first ONU via a first optical fiber;

a second transceiver configured to perform optical communication with the at least one second ONU, the second transceiver being connected to the at least one second ONU via a second optical fiber;

a power supply configured to supply electrical power; and processing circuitry comprising at least one of a processor, an application specific integrated circuit (ASIC), or a field programmable gate array (FPGA), the processing circuitry configured:

to supply the electrical power supplied by the power supply to the first transceiver and control the first transceiver;

to supply the electrical power supplied by the power supply to the second transceiver and control the second transceiver; and to turn off power to the first transceiver by stopping to supply power to the first transceiver during a first period when the number of the at least one first ONU falls below a first predetermined number, and to turn off power to the second transceiver by stopping to supply power to the second transceiver during a second period when the number of the at least one second ONU falls below a second predetermined number, and the processing circuitry notifies the at least one first ONU of the first period with a Normal Gate frame to halt communication during the first period and notifies the at least one second ONU of the second period with a Normal Gate frame to halt communication during the second period.

19. An optical communications system comprising:

at least one first optical network unit (ONU) corresponding to a first transmission rate;

at least one second ONU corresponding to a second transmission rate different from the first transmission rate; and an optical-line terminating device, wherein, the optical-line terminating device comprises:

a first transceiver configured to perform optical communication with the at least one first ONU, the first transceiver being connected to the at least one first ONU via a first optical fiber;

a second transceiver configured to perform optical communication with the at least one second ONU, the second transceiver being connected to the at least one second ONU via a second optical fiber;

a power supply configured to supply electrical power; and processing circuitry comprising at least one of a processor, an application specific integrated circuit (ASIC), or a field programmable gate array (FPGA), the processing circuitry configured:

to supply the electrical power supplied by the power supply to the first transceiver and control the first transceiver;

to supply the electrical power supplied by the power supply to the second transceiver and control the second transceiver; and to turn off power to the first transceiver by stopping to supply power to the first transceiver during a first period when the number of the at least one first ONU falls below a first predetermined number, and to turn off power to the second transceiver by stopping to supply power to the second transceiver during a second period when the number of the at least one second ONU falls below a second predetermined number, and the processing circuitry detects a distance to each of the at least one first ONU to perform a first classification process to classify each of the at least one first ONU to one of a plurality of classes corresponding to loss budget and adjusts optical transmission power and optical reception sensitivity of the first transceiver in accordance with a result of the first classification process, and detects a distance to each of the at least one second ONU to perform a second classification process to classify each of the at least one second ONU to one of the plurality of classes and adjusts optical transmission power and optical reception sensitivity of the second transceiver in accordance with a result of the second classification process.

* * * * *